(12) United States Patent
Windisch et al.

(10) Patent No.: US 12,326,364 B2
(45) Date of Patent: Jun. 10, 2025

(54) DETECTOR FOR SPECTROSCOPY

(71) Applicant: ams-OSRAM International GmbH, Regensburg (DE)

(72) Inventors: Reiner Windisch, Pettendorf (DE); Simon Lankes, Regensburg (DE)

(73) Assignee: ams-OSRAM International GmbH, Regensburg (DE)

( * ) Notice: Subject to any disclaimer, the term of this patent is extended or adjusted under 35 U.S.C. 154(b) by 149 days.

(21) Appl. No.: 18/040,760

(22) PCT Filed: Aug. 6, 2021

(86) PCT No.: PCT/EP2021/072011
§ 371 (c)(1),
(2) Date: Feb. 6, 2023

(87) PCT Pub. No.: WO2022/029292
PCT Pub. Date: Feb. 10, 2022

(65) Prior Publication Data
US 2023/0288253 A1    Sep. 14, 2023

(30) Foreign Application Priority Data
Aug. 7, 2020 (DE) .......................... 102020120935.5

(51) Int. Cl.
*G01J 3/02* (2006.01)
*G01J 3/12* (2006.01)
*G01J 3/28* (2006.01)

(52) U.S. Cl.
CPC ............. *G01J 3/0291* (2013.01); *G01J 3/021* (2013.01); *G01J 3/0256* (2013.01); *G01J 3/12* (2013.01);
(Continued)

(58) Field of Classification Search
CPC ......... G01J 2003/102; G01J 2003/1226; G01J 2003/2806; G01J 3/021; G01J 3/0229;
(Continued)

(56) References Cited

U.S. PATENT DOCUMENTS 5,726,805 A  * 3/1998 Kaushik ................. G02B 5/201
                                                                359/590
6,633,007 B1   10/2003 Lüchinger et al.
(Continued)

FOREIGN PATENT DOCUMENTS

DE     102008019600 A1    10/2009
DE     102016212088 A1    1/2018
(Continued)

*Primary Examiner* — Hina F Ayub
(74) *Attorney, Agent, or Firm* — Slater Matsil, LLP

(57) ABSTRACT

In an embodiment a detector for spectroscopy includes a housing comprises at least one aperture configured for supplying a light beam reflected or emitted from a target, the housing having at least one cross-sectional plane in which the at least one aperture comprises first and second non-contiguous intersecting surfaces, a detector arrangement with a detector surface configured for wavelength- and angle-dependent detection of light, the detector arrangement being arranged in the housing laterally spaced from the at least one aperture, a first reflector element arranged in the housing and a second reflector element opposite the detector surface, wherein the first reflector element is arranged in a beam path of the at least one aperture and is configured to direct a light beam incident through the at least one aperture onto the second reflector element, and wherein the second reflector element is configured to direct an incident light beam onto the detector surface.

20 Claims, 3 Drawing Sheets

(52) U.S. Cl.
CPC ..... *G01J 3/2803* (2013.01); *G01J 2003/1226* (2013.01)

(58) Field of Classification Search
CPC ...... G01J 3/0256; G01J 3/0262; G01J 3/0291; G01J 3/10; G01J 3/12; G01J 3/2803; G01J 3/42
See application file for complete search history.

(56) References Cited

U.S. PATENT DOCUMENTS

| | | |
|---|---|---|
| 8,045,159 B2 | 10/2011 | Egloff et al. |
| 10,760,968 B2 | 9/2020 | Haase et al. |
| 2008/0203314 A1* | 8/2008 | Harrison ............... G01J 3/0286 250/372 |
| 2012/0236382 A1* | 9/2012 | Puegner ................ G01J 3/1804 359/566 |
| 2015/0022811 A1* | 1/2015 | Cornell ................. G01J 3/0291 356/326 |
| 2015/0204511 A1 | 7/2015 | Rudmann et al. |
| 2020/0107723 A1* | 4/2020 | Huter ....................... A61B 3/12 |
| 2021/0231496 A1* | 7/2021 | Chafekar .................. G01J 3/42 |

FOREIGN PATENT DOCUMENTS

| | | |
|---|---|---|
| DE | 102017127122 A1 | 5/2019 |
| EP | 1144964 A1 | 10/2001 |
| WO | 0037902 A1 | 6/2000 |
| WO | 2017083325 A1 | 5/2017 |
| WO | 2019215323 A1 | 11/2019 |

\* cited by examiner

DETECTOR FOR SPECTROSCOPY

This patent application is a national phase filing under section 371 of PCT/EP2021/072011, filed Aug. 6, 2021, which claims the priority of German patent application 10 2020 120 935.5, filed Aug. 7, 2020, each of which is incorporated herein by reference in its entirety.

TECHNICAL FIELD

The present invention relates to a detector for spectroscopy at close range of a target.

BACKGROUND

Miniaturized spectrometers are required for the integration of spectrometric functions into portable devices, such as cell phones. Such spectrometers usually comprise a light source and a detector that is sensitive to at least two different wavelengths. In these embodiments, the light source may be a light-emitting diode LED whose emitted light is distributed over the desired spectral range.

For a measurement, the object to be measured is now illuminated by means of the LED and then reflected or transmitted light is measured depending on the wavelength. For this purpose, it is necessary to separate the light into different wavelengths in order to feed them to different areas of the detector. Otherwise, a detector, especially a semiconductor-based detector, would only measure the sum of the light from different wavelengths, preventing a wavelength-resolved measurement.

There are various concepts for this. On the one hand, light with different wavelengths can be emitted at different times, so that the detector only receives the light of one wavelength reflected or transmitted by the object. However, the disadvantage of this method is a significantly longer measurement in the range of several 100 ms.

Alternatively, broadband light can be reflected from the object and detected in the detector if it is wavelength resolved. Such detectors also have some dependence on the angle of the incident light. It follows that detectors operating with this concept must have a narrow aperture, which thus spatially limits the incidence of light.

FIG. 1 shows an embodiment of a spectroscopy detector operating according to this principle. The detector arrangement comprises a housing with an aperture 94 and a detector array 91 arranged opposite the aperture. The detector array 91 has several sensors 92a, 92b to 92d arranged side by side, above each of which an interference filter is arranged. Interference filters of this type are narrow-band bandpass filters that transmit only light of a narrow wavelength range but block other light. However, in order to produce the narrow bandwidth necessary for spectroscopy, interference filters, also known as dielectric filters, exhibit angular dependence. Therefore, the aperture 94 is relatively narrow, with the aperture angle α resulting from the aperture diameter of the aperture 94 and the height h of the housing 90.

In the case of spectroscopy of inhomogeneous objects by means of an applied or spaced measurement, the small aperture of the arrangement shown in FIG. 1 results in a high sensitivity with respect to possible inhomogeneity on the surface of the object to be measured. For example, the reflective properties of human skin can be locally altered by hairs, moles, small injuries or even insect bites and scars, so that the conclusions drawn from the measurement data become inaccurate.

SUMMARY

Embodiments provide a detector arrangement for spectroscopy that is insertable into portable devices and has lower sensitivity with respect to inhomogeneity of the target.

The inventors have recognized that in order to avoid sensitivity to inhomogeneity of an object to be measured, it is convenient to combine light from a significantly increased area or from multiple area regions. However, a significantly enlarged area is accompanied by a larger aperture, which in turn degrades the signal-to-noise ratio and induces measurement errors in the dielectric filters used on the detector array. For this reason, the inventors propose to suitably utilize the relationship between a light collecting area and subsequent light folding within the housing of a detector array.

For this purpose, in one aspect, a detector for spectroscopy in the close range of a target is provided, comprising a housing having at least one aperture for feeding a light beam reflected or emitted by the target. The detector further comprises a detector arrangement with a detector surface which is designed for wavelength- and angle-dependent detection of light. The detector arrangement is thereby arranged in the housing laterally spaced from the at least one aperture. In other words, the detector arrangement is thus not in direct line with the aperture. Furthermore, a first reflector element and a second reflector element opposite the detector surface are arranged in the housing.

The first reflector element is thereby placed such that a light beam incident through the at least one aperture is directed onto the second reflector element. In one aspect, the second reflector element comprises at least one mirror symmetry plane and is configured overall to direct an incident light beam onto the detector surface.

The light beam entering the housing via the at least one aperture is thus reflected at least twice by the at least two reflector elements arranged in the housing. This significantly increases the light path compared to a stretched arrangement as shown in FIG. 1. By folding the light path, an improved angle limitation can be realized with the same aperture size with respect to a reduced overall height compared to a simple aperture.

In one aspect, the at least one aperture comprises a plurality of spatially separated apertures such that the arrangement thus simultaneously detects radiation incident on the plurality of apertures. This effectively averages over the area of all apertures or openings. Local inhomogeneities in the incidence of light play less of a role due to this averaging.

It is conceivable that the housing is configured with at least one aperture for feeding a light beam reflected or emitted by the measurement object, wherein the housing has at least one cross-sectional plane in which the at least one aperture has a first and a second non-contiguous intersection surface. Thus, either a plurality of point or mirror symmetric apertures are provided, or the at least one aperture is a contiguous aperture extending over a larger segment. In another aspect, the cross-sectional plane passes through the detector arrangement, which thus forms a point for any point symmetry.

In a further aspect, the second reflector element is configured such that the light path from a first region of the at least one aperture corresponding to the first cut surface to the detector can be substantially converted into a further light path from a second region of the at least one aperture corresponding to the second cut surface to the detector by rotation along the axis of rotation SE running perpendicularly through the detector.

In one aspect, the at least one aperture has a first aperture and a second aperture opposite the first aperture. A virtual junction of the first aperture and the second aperture intersects the detector surface and the second reflector element. In another aspect, additional apertures may be provided in some symmetry such that the influence of a preferred direction in the distribution of the components of the target is additionally reduced. In one example, the detector comprises four apertures symmetrically arranged in the housing and distributed around the detector surface.

In some cases, increasing the aperture in this manner may increase the amount of light at the detector array, thereby increasing efficiency. In another aspect, the at least one aperture may form a circular segment or circle. In this regard, the detector aperture is particularly disposed at a virtual center of the circle segment or circle. Thus, the aperture may be arranged symmetrically about the detector surface. This increases the amount of light and at the same time creates a high degree of symmetry with respect to inhomogeneities.

In another aspect, a transparent cover may be disposed over the aperture. The cover may be formed from a diffuser sheet. While this reduces light sensitivity, it further improves sensitivity to inhomogeneities. In another aspect, the transparent cover is inserted the aperture so that the housing is at least closed in a dust-tight manner. In addition, the cover may also be configured to hermetically seal the housing.

In another aspect, the housing with the elements provided therein is configured as a cavity so that light can propagate within this cavity via the reflector elements to the detector arrangement. Alternatively, the volume of the housing may be filled, for example with a transparent material, and the reflector elements are configured as mirrored surfaces of this volume. Alternatively, total internal reflection can be used due to the difference in refractive index when light is incident on the surface at a sufficiently oblique angle. This results in an intrinsically transparent volume that includes reflective and light-absorbing elements on its surface.

Another aspect concerns the reduction of stray light that enters the housing or volume via the openings. Such stray light should be kept away from the detector as far as possible, so that the detector only detects the light beam deflected by the light folding. For this purpose, in one embodiment a border surrounding the detector arrangement is provided. This extends in the direction of the second reflector element in and projects beyond the detector surface. In particular, the surround is covered with a light absorbing material. In one aspect, the surround is spaced somewhat from the detector surface so that a space remains between the detector arrangement and the surround. This gap may also be configured to be light absorbing.

In addition to such a border, other elements may be provided to prevent or reduce stray light within the housing. In one aspect, the detector includes an aperture laterally disposed on the side of the at least one aperture between the at least one aperture and the second reflector element. The aperture extends toward the first reflector element and may also comprise a density absorbing coating. Thus, only light at a certain angle reaches the first reflector element through the aperture around the aperture: this angle can be adjusted by the size and shape of the aperture. In particular, this can be used to prevent light from passing through the aperture at a shallow angle directly onto the detector without touching the two reflector elements.

In addition, further apertures can be provided in the housing, which are arranged outside the desired beam path and thus further reduce the incidence of stray light on the detector. This improves the signal-to-noise ratio.

Another aspect relates to the design and shape of the first or second reflector element. In one example, the reflector element is configured with a mirror symmetry plane such that it comprises at least two reflector surfaces arranged in mirror symmetry. In another aspect, the reflector element may include a curved reflector surface. By curving the reflector surface, some focusing of light on the detector surface may be achieved. As a result, a possible angle of incidence on the detector surface may be altered, and in particular reduced.

In addition to the proposed two reflector elements, additional reflector elements may be provided to further extend the light path and thereby reduce the angle of incidence on the detector surface. In one aspect, a third reflector element is provided which is located on the same side of the housing as the detector arrangement, and has a substantially flat surface. In this embodiment, the first reflector element is arranged to direct an incident light beam onto the third reflector element, which in turn directs the incident light beam onto the second detector element. In this embodiment, the third reflector element thus reflects the light three times before it reaches the detector surface.

In addition, the various reflector elements can be designed differently. In one embodiment, the reflector elements are formed as mirror surfaces. In a further aspect, the second reflector element is formed by a recess that can, in particular, rise above the at least one aperture. The side walls of this recess thus form the reflecting surfaces of the reflector element and are arranged in the beam path such that they direct the light beam incident from the first reflector element onto the detector surface. Depending on the embodiment, the recess may be round, parabolic, or even formed as, for example, a V-shaped trench. Thus, in one aspect, the second reflector element forms a top surface of the detector. In this regard, the second reflector element may be connected to the housing via webs.

In a further aspect, the detector arrangement comprises a first sensor having a first interference filter for detecting light of a first wavelength and at least one second sensor having a second interference filter for detecting light of a second wavelength. The two sensors as well as the second reflector element are arranged in such a way that an incident light beam illuminates the detector area formed by the two sensors substantially uniformly. Depending on the design and shape of the apertures, the detector area can thus also be formed. In one embodiment, the detector area is formed as a rectangular matrix with multiple sensors. Accordingly, in this embodiment, the aperture may also be formed as a rectangular aperture. In this case, the aperture dimension can be formed slightly larger than the detector area, so that this ensures that the light intensity of an incident light beam is distributed substantially uniformly over the detector area. In another embodiment, the detector area is formed as an n×n matrix, in which embodiment the apertures may be arranged symmetrically or circularly around this detector area.

In another aspect, the light emitting devices of the proposed detector are configured. Thus, in one aspect, the detector comprises at least two light emitting devices that emit light of different wavelengths. In this aspect, however, it is convenient if the light from these light emitting devices is well mixed before impinging on the target so that it uniformly illuminates the target. The components can thus be designed to emit light in a first spectrum and not in a second spectrum. Overall, the spectral distribution of the at least two light emitting devices is thus as overlapping as possible and in particular covers the different wavelengths to which the detector arrangement is particularly sensitive. In one aspect, conversion elements may additionally be arranged above the at least two light emitting devices. These conversion elements serve to convert light of a first wavelength into light of a second wavelength. The conversion may be a full conversion, but may also be only a partial conversion. In the latter case, a light-emitting element thus generates a broadened total spectrum from the converted and unconverted light.

Another aspect deals with the arrangement and position of the light emitting components. Thus, it may be provided that the position of a first light emitting device can be converted to the position of a second light emitting device by rotation along the axis of rotation SE passing perpendicularly through the detector. This rotation may also be performed with multiple devices, each rotation being by the same angle. In one aspect, the detector comprises at least two light emitting devices and at least two apertures, wherein the distance between the first light emitting device and the first aperture is equal to the distance between the second light emitting device and the second aperture.

Another aspect concerns the arrangement of the light emitting components with respect to the detector. In one embodiment, these are arranged on both sides or symmetrically around the at least one aperture. This ensures that the object to be measured is illuminated as uniformly as possible by the light-emitting components. The light emitting components can be controlled simultaneously but also sequentially in order to realize special aspects of the measurement, if necessary.

In another aspect, the at least two light emitting components are arranged in a recess of the housing. This recess of the housing is located on a side facing the at least one aperture and is arranged between the aperture and the reflector element, in particular the second reflector element. This achieves a particularly compact design.

In one embodiment, one side wall of the recess is substantially vertical, and the other side wall of the respective recess is sloped. The sloping side wall simultaneously forms a reflector surface of the second reflector element. In one embodiment, contact lines are led to the outside via the surface of the housing. The contact lines may be made of ITO or another transparent material, for example, so that no shadowing occurs through the contact lines. In another embodiment, in which the reflector element is connected to the rest of the housing via connecting webs, the contact lines may be routed over these connecting webs.

In a further aspect, the light-emitting components are designed as horizontal light-emitting diodes, with the contact elements on the underside of the recess being guided to the underside of the housing via a through-plating. This embodiment example is particularly useful if the housing is designed as a volume body, i.e. is filled with a material. Furthermore, a conversion element for light conversion may be arranged in the recess. In a particular embodiment of this proposed principle, the housing is designed as a transparent housing. Corresponding side surfaces are mirrored and thus serve as reflector elements. The other surface areas of the housing are covered with a light-absorbing material.

BRIEF DESCRIPTION OF THE DRAWINGS

In the following, the invention is explained in detail with reference to the drawings by means of some embodiment examples.

DETAILED DESCRIPTION OF ILLUSTRATIVE EMBODIMENTS

The following embodiment examples concern various aspects and combinations thereof according to the proposed principle. In this regard, the embodiment examples are not generally shown to scale. Likewise, various elements may be shown enlarged or reduced in size to emphasize individual aspects. However, it will be understood by those skilled in the art that the aspects illustrated herein may be combined with each other in the various embodiments and process steps without detriment to the inventive concept. Some aspects show a regular structure or shape. It should be noted here, however, that slight differences and deviations from the ideal shape may occur in practice without this being contrary to the inventive concept.

For a spectrometric measurement of an object, various aspects are of importance. These include the wavelength-dependent resolution of the detectors used, but also the sensitivity to inhomogeneities of the measurement object.

Figure 1:
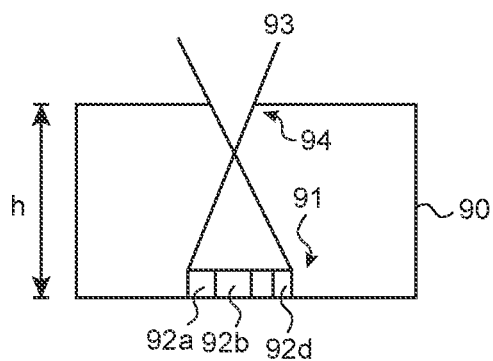
FIG. 1 shows an embodiment of a known detector.

A typical exemplary and known sensor is shown in FIG. 1. Here, a detector arrangement 91 is located in a light-absorbing housing 90 with a light entry opening 94, which will be referred to as aperture in the following. Thus, by a suitable choice of the height h and the aperture size, the angle of entry a of the light onto the detector can be limited. This limitation is necessary because the detector arrangement 91 has various wavelength-dependent sensors 92*a*, 20*b* to 92*d*. These wavelength-dependent sensors include a wavelength-selective filter, such as an interference filter or a dielectric filter. As a result, each sensor is sensitive to only a limited range of wavelengths. However, the interference filter has an additional angular dependence due to its operation, i.e., its transmission even at the transmission wavelength is thus dependent on the angle of incidence. For a good wavelength resolution, the limitation of the angle of incidence α is therefore of particular importance.

With an increased aperture, the angle of incidence thus also becomes larger, so that the wavelength resolution of the detector array is reduced. On the other hand, reducing the aperture improves the wavelength resolution, but reduces the amount of incident light. In addition, inhomogeneities of the target, i.e., inhomogeneities in the reflected light of the target, are amplified by a smaller aperture and can thus lead to a falsification of the measurement result. It may be possible to increase the effective aperture area by placing a diffuser disk in front of the aperture. This mixes the light from a larger area. However, scattering losses lead to a significant reduction in detector efficiency. An alternative would be to use several sequentially operated narrowband light sources, but this increases the measurement time. Although a simplified detector can be used, it is particularly susceptible to scattering or ambient light, since it is now not wavelength-dependent.

In order to reduce or avoid the preceding problems, the inventors propose a modified detector. This is based on the principle that an angular dependence depends mainly on the running length of the light between aperture and detector. In general, an increased run length for a given aperture area reduces the angular dependence. In the example of FIG. 1, increasing the height h would correspondingly decrease the angle α while keeping the aperture size constant. Conversely, an increased aperture also implies an increased angle α and thus limits the spectral resolution of the spectroscope or detector. The inventors now propose a combination of both aspects, in which the light is reflected several times within the housing before it falls on the detector.

Figure 2:
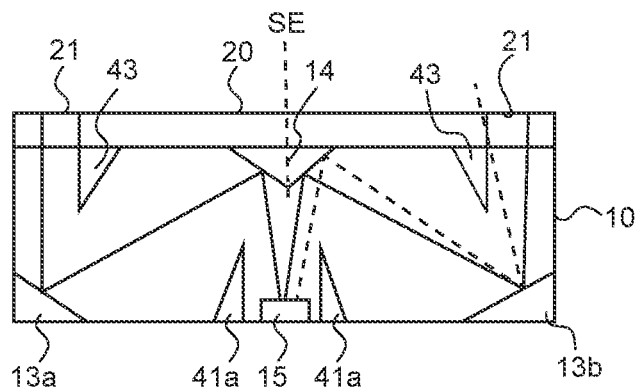
FIG. 2 shows a first embodiment of a detector for spectroscopy according to the proposed principle.

In this regard, FIG. 2 shows a first embodiment of this proposed principle with some aspects explaining the invention. The detector comprises a housing 10 which is coated on its inner side with light absorbing material. The housing comprises a height of at most 3 mm, advantageously at most 2 mm. The housing 10 further comprises on its upper side two apertures 21 arranged opposite to each other. The apertures 21 are implemented by means of a transparent material, so that light can enter the housing 10 from the outside. Furthermore, the apertures 21 are part of a cover 20 which, except for the apertures 21, is implemented with a light-absorbing material, in particular on the inside of the housing. Alternatively, the cover 20 may also be transparent, provided that there is a light-absorbing layer between the cover and the volume in the housing 10.

The housing 10 further comprises a detector arrangement 15. This is arranged laterally spaced on the underside of the housing, i.e. on the side opposite the aperture 21. The detector arrangement 15 is surrounded by a border 41a at a small distance. This is coated with a light absorbing material. The surround 41a extends beyond a detector surface 15 (not shown here) and serves to shade stray light which might otherwise fall on the detector surface of the detector arrangement 15.

Furthermore, the housing 10 comprises a first reflector element 13a and 13b, which are arranged in the corners of the housing in the beam path to the respective aperture 21. The reflector elements 13a and 13b are coated with a metallization mirror layer or another highly reflective material.

In addition, a second reflector element 14 is provided opposite the detector arrangement on the underside of the cover 20. An incident light beam or ray, shown here by the continuous line, is now reflected by the first reflector element 13a or 13b and deflected in the direction of the second reflector element 14. At the latter, it is again reflected due to the slanted reflector surface and deflected onto the detector surface. This results in a twofold folding of the light path, which is thus significantly enlarged. As a result, the angle of incidence becomes steeper with respect to a normal angle of incidence on the detector surface.

Also shown in FIG. 2 is a second dashed beam of light entering the right aperture and reflected by the reflector element 13b. After reflection, it strikes the second reflector element 14 and is deflected onto the detector surface of the detector arrangement 15. This results in a light beam with a maximum angle of incidence with respect to a normal of the respective aperture for a given aperture 21. An incident light beam is folded and directed onto the detector arrangement via two or more reflector elements. By folding the light path, an angular limitation can thus be realized with a reduced height compared to a simple aperture.

The arrangement in FIG. 2 is shown mirror-symmetrical with respect to the mirror plane SE. However, this is basically only due to the possibility of representation and does not represent a limitation of the three-dimensional design possibilities. The essential features of the arrangement consist in guiding the light from several apertures towards the same detector, the running length of the light from the aperture to the detector being substantially identical for all apertures. This implies a substantially equal horizontal distance of the apertures from the detector. The positions and orientations of all the beam carrying elements can be mapped into each other by rotating the arrangement of elements defining the light travel path from one of the apertures to the detector about the axis of rotation SE.

In the embodiment of FIG. 2, additional apertures 43 are provided. These are arranged between the aperture and the second reflector element and comprise a substantially vertical surface adjacent to the aperture 21. The second side edge of the aperture 43 is beveled for stiffening and better support. This is a design concept and may be configured differently depending on the embodiment. The length of the aperture 43 has the effect of limiting the angle of incidence of the light beam. This allows stray light to be absorbed on the one hand and the angle of incidence to be adjusted as required on the other.

In the geometry of FIG. 2, two axes of incidence are obtained on the detector, which is caused by the mirror symmetry of the second reflector element 14. These each encompass a certain angular range, whereby the angular range of the two incidence axes does not necessarily overlap. However, due to the symmetrical arrangement of the second reflector element in particular, the two incidence axes are inclined by the same angle with respect to the normal on the detector surface. This allows transmission filters, i.e., the interference or dielectric filters on the sensors of the detector array to be optimized for light at the angle of the respective axes of incidence.

In other words, the interference filters are now designed such that their maximum transmission at the desired wavelength is not at a perpendicular incidence, but at an angle of incidence inclined with respect to the perpendicular. As shown in FIG. 2, the angle may be, for example, 20° with respect to the perpendicular to the detector for each light beam, i.e., the left and right light beams. If the transmission properties of the interference filters of the sensors of the detector arrangement are optimized for this angle of incidence, the light path from the aperture to the detector should be limited to a narrow angular range around 20°, i.e., for example, to angles of 10° to 30°, by appropriate alignment and dimensioning of the reflector elements and other apertures.

Figure 3:
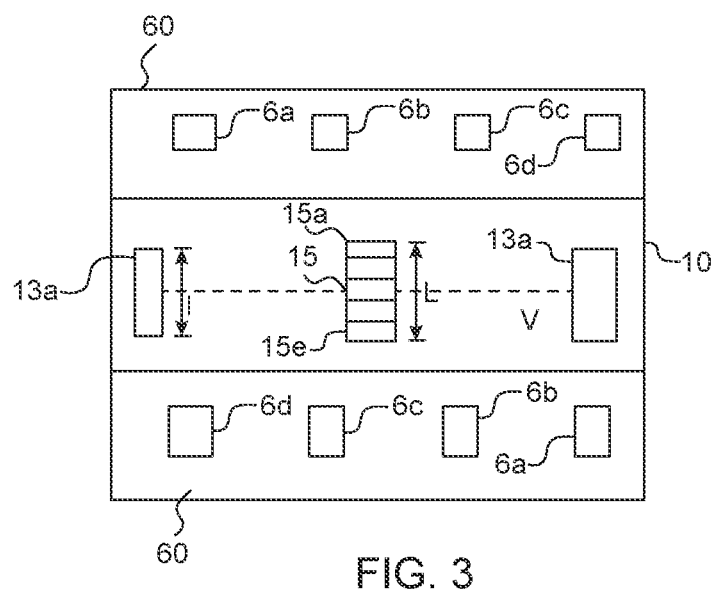
FIG. 3 shows a top view of a detector with additional light-emitting components.

FIG. 3 shows a top view of the detector arrangement with additional light-emitting components. The housing 10 of the detector is arranged centrally and has an extension 60 on both sides. A plurality of light emitting components 6a, 6b, 6c and 6d are incorporated in the extension 60. These are arranged in two opposing rows as shown in the figure, so that a certain point symmetry and thus approximately identical spectral illumination is produced on both apertures. The light emitting devices produce light in different colors so that the detector as a whole emits light with a wide spectral bandwidth onto a target. It is crucial for the function that both apertures are illuminated with an equivalent spectrum. For this purpose, the distances between the light-emitting components of the same color to both apertures must be identical, which can be achieved by reversing the color sequence between the top and bottom rows. In addition, a common diffuser layer is provided over each emitter row to homogenize the illumination. Alternatively, on devices may be provided that emit a same color wherein different conversion materials may be provided on each of the devices. In another alternative embodiment, the devices emit a common relatively broad spectrum so that measures such as conversion materials can be omitted.

In this example, the apertures 13a and 13b are rectangular in shape and include a length. They are arranged opposite to each other along a virtual link line V, with the detector arrangement 15 mounted at a center of the link line. The detector arrangement 15 comprises a plurality of sensors 15a to 15e, each of which is configured with a wavelength-sensitive interference filter. A light beam incident through the apertures 13a and 13b is directed by the first reflector element 13a or 13b (not shown here) to the second reflector element above the detector arrangement 15, which in turn reflects it to the detector arrangement.

The detector of FIG. 3 thus forms a spectrometer. If this spectrometer is now placed on the skin or another target to be characterized, the target is illuminated essentially homogeneously by the light emitting diodes 6a to 6d in the vicinity of the apertures of the sensor. The reflected light scattered by the measuring object is now collected in the two apertures and filtered by the geometry with respect to the propagation angle and thus detected by the detector as a function of the wavelength. Thus, the proposed detector is suitable not only for measurement in direct contact, but also for measurement for objects a small distance. Due to its flat design, the detector of all embodiments presented here, is particularly suitable for installation in cell phones or other portable devices.

Due to the distance of the apertures from each other, especially when using several apertures arranged symmetrically around the detector, the light in these apertures is averaged during a measurement. This reduces inhomogeneities of the measured object and roughnesses on the surface of the measured object influence the measurement result only to a subordinate extent. In addition, depending on the geometry used, reflector elements and their arrangement among each other, a slightly enlarged etendue can also be obtained to a small extent due to the enlarged aperture.

Figure 4:
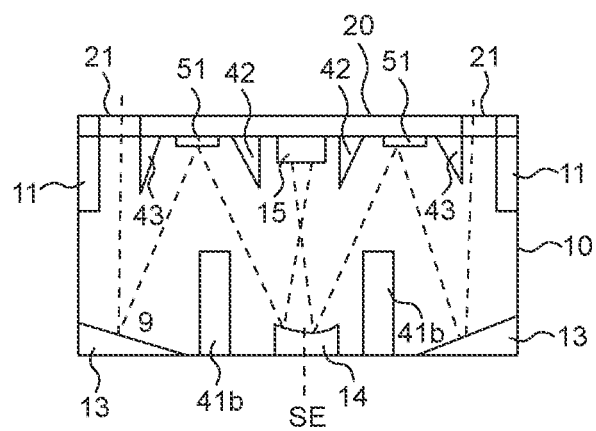
FIG. 4 shows a side view of another embodiment of the detector according to the proposed principle.

FIG. 4 shows a further configuration of a detector with an additional third reflector element 51. In this configuration, the first reflector element 13 is designed with a different angle compared to the configuration of FIG. 2, so that an incident light beam is deflected onto the third reflector element 51. The third reflector element 51 is thereby arranged on the same side as the detector arrangement 15 in the housing 10 and comprises a mirrored surface which is substantially horizontal. The third reflector element 51 reflects an incident light beam and deflects it onto the second reflector element 14. The second reflector element 14 is configured as a parabolic mirror and focuses the incident light onto the detector surface of the arrangement 15.

Moreover, also as in the previous example, in this embodiment a plurality of apertures are provided in the volume 9 of the housing. For example, the second reflector element 14 is surrounded by a plurality of apertures 41b that block stray light from the second parabolically shaped reflector element 14. Similarly, the aperture 21 is bounded by an aperture arrangement 11 and 43. Thus, the aperture 21 is limited on both sides, so that the entrance angle of the light beam is already limited by the aperture.

Figure 5:
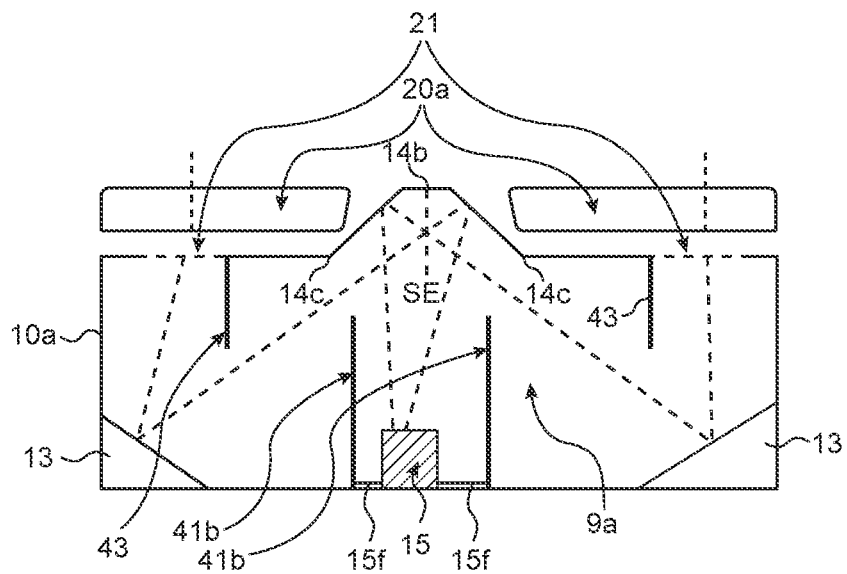
FIG. 5 shows a third embodiment of a detector illustrating the proposed principle.

Another embodiment of a detector is shown in FIG. 5. In this embodiment, the reflector element is designed with a flat surface 14b inverted, i.e., it forms a recess on the surface of the housing 10a. For this purpose, the reflector element is connected to the housing exterior 10a via a plurality of webs. The webs thus interrupt the aperture 21 and are executed here in the embodiment example as dashed lines.

The second reflector element shows in cross-sectional view an inverted V-shaped recess with a base surface 14b and two reflector side surfaces 14c. These are arranged symmetrically along a mirror symmetry axis SG on both sides of the base surface. Light, shown here as dashed, which enters the detector through one of the two apertures 21 is deflected by the first reflector elements onto one of the two mirrored side surfaces of the second reflector element and from there is reflected onto the detector surface of the detector arrangement 15.

The detector arrangement 15 is again surrounded by an absorbent border 41 B, which is spaced from the detector 15. An absorbent layer 15f is additionally applied here to the underside of the housing. The height of this border clearly exceeds the detector area, so that stray light is suppressed. Likewise, input bezels 43 are brought to the housing surface and thus to the second reflector element 14. In this embodiment, the height of the border 41b and the length of the aperture 43 are selected to overlap. This means that the total length from the height of the surround 41b and the aperture 43 is greater than the height of the housing. This creates an opening between the surround and the respective apertures, through which incident light is reflected by the first reflector element 13. Depending on the embodiment, the height of the apertures 43 as well as the height of the surround 41b can be selected accordingly in order to deflect only a very narrowly limited light cone onto the detector. The angle of the respective reflector elements 13 can be adjusted accordingly for this purpose.

Finally, the apertures 21 on the housing surface are covered by a transparent cover layer 20a. In one embodiment, this layer also secures the reflector element 14b, thus ensuring a stable position of the reflector element.

Figure 6:
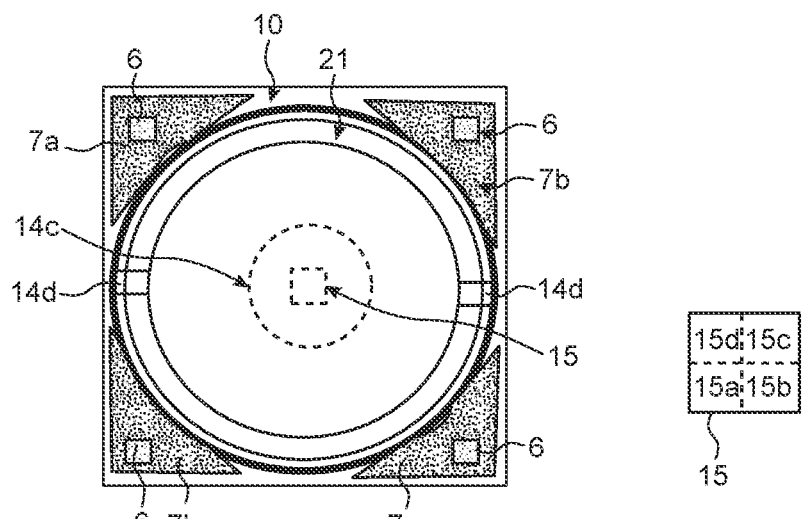
FIG. 6 shows a top view of a detector with additional light emitting devices according to some aspects of the proposed principle.

A top view of such a detector is shown in FIG. 6. The annular aperture results from rotation of the arrangement according to FIG. 5 or FIG. 2 about the axis of rotation SE. Likewise, the beam guiding elements not shown are arranged essentially rotationally symmetrically. This allows the two apertures separated in the cross-section of the detector to merge into a single aperture in three dimensions. In this embodiment example, two webs 14d are provided which hold the inner piece and thus the second reflector element 14 in position. The webs are formed in such a way that overall shadowing is minimal. At the same time, the aperture 21 is divided in this way into two circular segments of essentially equal size. An addition of further webs would lead to further separated apertures. Further centrally arranged is the detector arrangement 15, as well as the second reflector element with its base surface 14b and its side surfaces 14c. The side surfaces 14c are led out so far that their outer and lower end terminates in extension with the border 41b. This embodiment is shown in FIG. 5.

Furthermore, the arrangement shows several light emitting diodes 6 arranged symmetrically around the aperture, on each of which a conversion layer 7a or 7b is applied. The conversion layer 7a and 7b is designed to convert light of a first wavelength into light of a second and a third wavelength, respectively. Thereby, the spectra of the light emitted by the light emitting diodes 6 and the converted light may partially overlap. In this way, a light with a relatively broad spectrum is generated, which is emitted homogeneously onto the measurement object located above the aperture 21. The light reflected by the measuring object falls through the aperture 21 and is directed by the first reflector element 13 and the second reflector element 14b onto the detector 15.

In this example, the detector array 15 includes four square sensors forming a 2×2 matrix. Each sensor includes a light-sensitive device for detecting light. An interference filter is also arranged above each sensor, the pass characteristic of which varies so that different spectral components of the reflected light from the target can be captured and detected.

FIG. 5 thus shows a similar sensor but with a different geometry of the second reflector element above the detector arrangement 15 compared to FIG. 2. In the geometry according to FIG. 2, the volume of the mirrors 14 and the cover plate 20 above them cannot be used for the beam path. In contrast, this volume is used for the beam path in the geometry according to FIG. 5, which enables a longer light path and thus an improved possibility of angle limitation with the same detector arrangement, or a lower overall height or a reduced lateral dimension with the same angle limitation.

In this embodiment, the second reflector element comprises an obliquely arranged individual mirror in the form of a truncated pyramid above the detector arrangement. The truncated pyramid also forms the surface 14b of the second reflector element. The truncated pyramid is mirror-symmetrical with respect to an axis through the center point.

In the embodiment shown in FIG. 6, an additional non-transparent barrier 8 is also installed between the aperture cover and the light sources. This prevents light from the individual light-emitting diodes 6 from entering the aperture directly, i.e. without reflection from the target.

Figure 7:
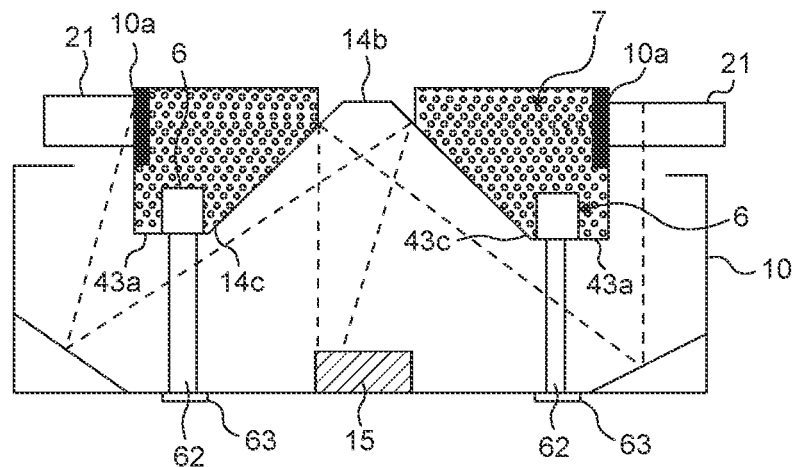
FIG. 7 shows another embodiment of a detector for spectroscopy with some aspects of the proposed principle.
Figure 8:
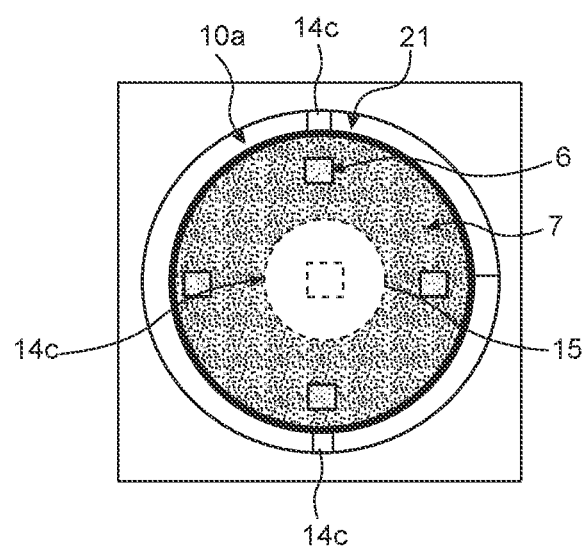
FIG. 8 shows a top view of the detector according to the embodiment of FIG. 7 with some alternative aspects.

A further design with integrated light emitting diodes is shown in FIG. 7 and FIG. 8 in plan view. The integrated design allows the volume of the entire detector to be further reduced without having to compromise on the light path length. The background is that only part of the volume of the housing is required for the light path. This means that the unused area of the housing can be used for other purposes.

Figure seven shows the cross-section of a miniature spectrometer in which this volume is used for the integration of light-emitting components. The light emitting devices are located in a recess, the center of which is bounded by the second reflector element. The recess thus extends around the second reflector element 14, with its reflective mirror surface 14c simultaneously constituting the outside of the recess. The recess is also filled with a conversion material 7, which is laterally connected to a barrier 10a.

The barrier 10 prevents converted or unconverted light from the conversion element from entering the aperture directly. In this embodiment, according to FIG. 8, a total of four light emitting devices are arranged in the recesses. The recess with the second reflector element arranged in between is also mechanically coupled to the housing outer side 10 via webs 14d and is held in position by the latter.

The partition between the light emitting devices 6 and the detector array inside the housing on the bottom side absorbs light and performs the function of an aperture for beam guiding. The top of the recess is reflective to allow high efficiency of the light emitting devices.

In this embodiment, it is particularly convenient if the housing is designed as a full volume with a transparent material. Then, the surfaces of the elements 13 as well as the surface of the second reflector element 14b would be reflective and mirrored. The other surfaces of the volume 9 of the housing 10 are coated with an absorbent material. The design of the housing 10 as a volume is expedient, since the recess, and also the corresponding reflector elements, can be manufactured in a simple manner by suitable shaping of the volume. In particular, manufacturing methods using transparent materials by means of injection molding or a similar process are suitable. Moreover, an additional cap 21 for dust-tight or hermetic sealing can be omitted.

Another aspect of a solid volume is the design of through-holes 62 with which the light-emitting components 6 can be contacted. In the present embodiment, contact holes 62 are provided for this purpose, extending from a bottom side of the light-emitting component 6 in the recess to a rear side of the housing volume at a contact plane 63. Thus, the light emitting components can be electrically connected from the rear side of the detector.

In an alternative embodiment, contacts are provided that run along the outer surface of the housing of the recess and then continue outward over the aperture. In one embodiment, this can be done, for example, via the webs 14d shown in FIG. 8. In another embodiment, in particular using ITO or a transparent conductive material, the electrical leads for the light emitting components can be formed via the aperture.

Thermal connection of the light-emitting components at the mounting level is difficult in this embodiment. However, the light emitting devices can be operated with single short pulses, so this is not a further problem. Such operation also has the advantage that a dark current of the detector array between the pulses can be detected and taken into account in the subsequent measurement. However, thermal difficulties may arise if the pulse train is faster or if light is emitted continuously. To improve a heat dissipation, vias can be used on the bottom side of the spectrometer housing. Likewise, a transparent plate or housing with good thermal conductivity could be used. Sapphire, for example, is suitable for this purpose, or silicon, gallium arsenide, or another semiconductor material for dull-operating spectrometers. Glass would also be conceivable as a thermally conductive material, which forms the volume body. In this case, the area around the detector arrangement can also be free of filler material, resulting in a kind of concave lens with which additional beam shaping is possible. In other words, the detector arrangement 15 is then arranged in a recess of the glass body 10, the shape of the recess forming a lens for focusing light.

In extreme cases, the housing can thus essentially consist of a base plate on which the detector array is mounted. Above this, in turn, the volume glass body is fixed. The mirrors, the apertures as well as the absorbing walls are then realized in this design by corresponding local coatings of the glass body. For reflecting layers metallizations are used, absorbing parts are blackened with a coating, for example on carbon basis.

Instead of glass, another transparent material can be used, e.g. plastic, sapphire or, for boring spectrometers, silicon. The recess for the light-emitting components is processed with a double coating. First, an absorbent, i.e. black, layer is applied to the glass body, and then a reflective layer is applied. The light-emitting components can be placed on this layer. For contacting, wired but also the metallic feedthroughs shown in FIG. 7 are suitable. If a glass body is used, electrically conductive tracks can also be applied which are electrically connected to the light-emitting components.

The embodiments disclosed herein and various aspects of the present examples may be combined in any manner. For example, the detectors may be solid volume bodies with corresponding apertures or the like introduced into the volume body by various etching or other processes. In the case of a solid volume body, the reflector elements are obtained by mirroring the corresponding surfaces, for example with a reflective metal. Alternatively, the detector comprises a housing with a suitable wall having absorbing or reflecting regions. The housing itself is filled with air or another inert gas.

In this context, it can also be said that a housing is filled with a volume material made of glass or another transparent material. In this context, a volume body is thus to be regarded as equivalent to a housing which is filled with a transparent material. To improve angular confinement, the reflective elements can be designed with smooth or also curved surfaces, whereby the curvature can also be faceted. Concave or other mirrors or lens shapes are suitable here, so that the light beam is not only deflected, but also directed to a focus. Non-reflecting areas are provided with an absorbing layer. In addition, apertures or borders can be provided so that stray light is absorbed. The number and choice of different reflector elements can be used to adjust the light path accordingly. Depending on the requirements, individual light-emitting components or combinations of light-emitting components with different wavelengths can be used. These can also include conversion elements of different types, resulting in a broadband light spectrum. If chips of different wavelengths are used, a diffuser element can also be used instead of a conversion element to generate light.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A detector for spectroscopy, the detector comprising:
   a housing comprising at least one aperture configured for supplying a light beam reflected or emitted from a target, the housing having at least one cross-sectional plane in which the at least one aperture comprises first and second non-contiguous intersecting surfaces;
   a detector arrangement with a detector surface configured for wavelength- and angle-dependent detection of light, the detector arrangement being arranged in the housing laterally spaced from the at least one aperture;
   a first reflector element arranged in the housing; and
   a second reflector element opposite the detector surface,
   wherein the first reflector element is arranged in a beam path of the at least one aperture and is configured to direct a light beam incident through the at least one aperture onto the second reflector element,
   wherein the second reflector element is configured to direct the light beam onto the detector surface, and
   wherein the second reflector element is designed such that a light path from a first region of the at least one aperture corresponding to a first cut surface to the detector arrangement is substantially convertible into a further light path from a second region of the at least one aperture corresponding to a second cut surface to the detector arrangement by rotation at an axis of rotation running perpendicularly through the detector arrangement.

2. The detector according to claim 1, wherein the at least one aperture forms a circular segment or circle, and wherein the detector surface is located at a virtual center of the circular segment or the circle.

3. The detector according to claim 1, further comprising a transparent cover arranged over or within the at least one aperture and sealing the housing in at least a dust-tight manner.

4. The detector according to claim 1, further comprising a border surrounding the detector arrangement, extending toward the second reflector element and overhanging the detector surface.

5. The detector according to claim 4, wherein the border surrounding the detector arrangement is spaced from the detector arrangement and has a light absorbing layer on a surface thereof.

6. The detector according to claim 1, further comprising an aperture mounted laterally on a side of the at least one aperture between the latter and the second reflector element and extending towards the first reflector element.

7. The detector according to claim 1, wherein the first reflector element and/or the second reflector element comprises at least one curved reflector surface.

8. The detector according to claim 1, further comprising a third reflector element disposed on the same side of the housing as the detector arrangement and comprising a substantially planar surface.

9. The detector according to claim 1, wherein the housing is filled with a transparent material, and wherein the reflector elements are formed by metallic mirror coatings on portions of the transparent material corresponding to the reflector elements.

10. The detector according to claim 1, wherein the housing includes a light absorbing surface external to the reflector elements.

11. The detector according to claim 1, wherein the detector arrangement comprises a first sensor having a first interference filter configured for detecting light of a first wavelength and at least one second sensor having a second interference filter configured for detecting light of a second wavelength.

12. The detector according to claim 1, further comprising at least one of the following:
    at least one light emitting device; or
    at least two light-emitting components, which are arranged essentially point-symmetrically around the detector arrangement and which are optionally configured to emit light of different wavelengths.

13. The detector according to claim 12, further comprising at least one conversion element configured for converting light of a first wavelength to light of a second wavelength via the at least one light emitting device.

14. The detector according to claim 12, wherein the at least one light emitting device is disposed in a recess on a side of the housing facing the at least one aperture between the at least one aperture and the second reflector element.

15. The detector according to claim 12, wherein the detector comprises at least two light emitting devices, and wherein a position of a first light emitting device is changeable to a position of a second light emitting device by rotation on the axis of rotation passing perpendicularly through the detector.

16. The detector according to claim 12, wherein the detector has at least two light emitting devices and at least two apertures, and wherein a distance between a first light emitting device and a first aperture is equal to a distance between a second light emitting device and a second aperture.

17. The detector according to claim 12, wherein the detector has at least two light emitting devices, and wherein the at least two light emitting devices are coupled by at least one via to a contact on a lower surface of the contact.

18. A detector for spectroscopy, the detector comprising:
a housing comprising at least one aperture configured for supplying a light beam reflected or emitted from a target, the housing having at least one cross-sectional plane in which the at least one aperture comprises first and second non-contiguous intersecting surfaces;
a detector arrangement with a detector surface configured for wavelength- and angle-dependent detection of light, the detector arrangement being arranged in the housing laterally spaced from the at least one aperture;
a first reflector element arranged in the housing;
a second reflector element opposite the detector surface; and
a third reflector element disposed on the same side of the housing as the detector arrangement and comprising a substantially planar surface,
wherein the first reflector element is arranged in a beam path of the at least one aperture and is configured to direct a light beam incident through the at least one aperture onto the third reflector element,
wherein the third reflector element is configured to direct the light beam onto the second reflector element, and
wherein the second reflector element is configured to direct the light beam onto the detector surface.

19. A detector for spectroscopy, the detector comprising:
a housing comprising at least one aperture configured for supplying a light beam reflected or emitted from a target, the housing having at least one cross-sectional plane in which the at least one aperture comprises first and second non-contiguous intersecting surfaces;
a detector arrangement with a detector surface configured for wavelength- and angle-dependent detection of light, the detector arrangement being arranged in the housing laterally spaced from the at least one aperture;
a first reflector element arranged in the housing; and
a second reflector element opposite the detector surface,
wherein the first reflector element is arranged in a beam path of the at least one aperture and is configured to direct a light beam incident through the at least one aperture onto the second reflector element,
wherein the second reflector element is configured to direct the light beam onto the detector surface, and
wherein the second reflector element is a recess which rises above the at least one aperture.

20. The detector according to claim 19, wherein the second reflector element is connected to the housing via webs.

* * * * *